(12) United States Patent
Yeo et al.

(10) Patent No.: US 9,863,587 B2
(45) Date of Patent: Jan. 9, 2018

(54) LIGHTING DEVICE AND LIQUID CRYSTAL DISPLAY DEVICE HAVING THE SAME

(75) Inventors: Sun Ho Yeo, Seoul (KR); Sic Hur, Seoul (KR); Byoung Eon Lee, Seoul (KR); Moo Ryong Park, Seoul (KR); Kwang Ho Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 265 days.

(21) Appl. No.: 14/236,029

(22) PCT Filed: Jul. 26, 2012

(86) PCT No.: PCT/KR2012/005960
§ 371 (c)(1),
(2), (4) Date: Apr. 1, 2014

(87) PCT Pub. No.: WO2013/019023
PCT Pub. Date: Feb. 7, 2013

(65) Prior Publication Data
US 2014/0204580 A1    Jul. 24, 2014

(30) Foreign Application Priority Data

Jul. 29, 2011  (KR) .................. 10-2011-0076267
Aug. 1, 2011   (KR) .................. 10-2011-0076458
(Continued)

(51) Int. Cl.
*F21V 7/04*    (2006.01)
*F21K 99/00*   (2016.01)
(Continued)

(52) U.S. Cl.
CPC .................. *F21K 9/50* (2013.01); *F21K 9/60* (2016.08); *F21K 9/65* (2016.08); *F21K 9/68* (2016.08);
(Continued)

(58) Field of Classification Search
CPC .... G02B 6/0018; G02B 6/021; G02B 6/0033; G02B 6/0055; G02F 1/133605; G02F 1/133615
(Continued)

(56) References Cited

U.S. PATENT DOCUMENTS 6,325,524 B1 * 12/2001 Weber .................. G03B 27/545
257/E25.02
7,438,429 B2 * 10/2008 Matsushita ....... G02F 1/133604
349/64
(Continued)

FOREIGN PATENT DOCUMENTS

JP    2005-135760 A    5/2005
JP    2006-019141 A    1/2006
(Continued)

OTHER PUBLICATIONS

Office Action dated Oct. 14, 2014 in Taiwanese Application No. 101127158.
(Continued)

*Primary Examiner* — Tsion Tumebo
(74) *Attorney, Agent, or Firm* — Saliwanchik, Lloyd & Eisenschenk

(57) ABSTRACT

A lighting device can include a base substrate, a plurality of LED light sources disposed in a center area of the base substrate in a first direction, and a resin layer stacked in a structure which covers the plurality of LED light sources. One or more printed circuit boards can be disposed on the base substrate.

15 Claims, 8 Drawing Sheets

(30) Foreign Application Priority Data

Feb. 21, 2012 (KR) ........................ 10-2012-0017283
Feb. 21, 2012 (KR) ........................ 10-2012-0017286

(51) Int. Cl.

| | | |
|---|---|---|
| F21V 8/00 | (2006.01) | |
| F21V 21/005 | (2006.01) | |
| F21K 9/60 | (2016.01) | |
| F21K 9/65 | (2016.01) | |
| F21K 9/68 | (2016.01) | |
| G02F 1/1335 | (2006.01) | |

(52) U.S. Cl.
CPC .......... *F21V 21/005* (2013.01); *G02B 6/0018* (2013.01); *G02B 6/0021* (2013.01); *G02B 6/0055* (2013.01); *G02F 1/1336* (2013.01); *G02F 1/133603* (2013.01); *G02F 1/133605* (2013.01); *G02B 6/0033* (2013.01); *G02F 1/133615* (2013.01); *G02F 2001/133612* (2013.01)

(58) Field of Classification Search
USPC ........................ 362/235, 249.02, 249.06, 628
See application file for complete search history.

(56) References Cited

U.S. PATENT DOCUMENTS

| | | | |
|---|---|---|---|
| 7,688,400 B1 | 3/2010 | Schellhorn et al. | |
| 8,206,000 B2* | 6/2012 | Tung | G02F 1/133603 362/237 |
| 8,348,490 B2* | 1/2013 | Yuuki | G02B 6/0036 362/606 |
| 8,465,168 B2* | 6/2013 | Adachi | G02B 6/0021 362/625 |
| 8,687,148 B2* | 4/2014 | Kubota | G02B 6/0021 349/62 |
| 8,834,000 B2* | 9/2014 | Kim | G09F 3/14 362/609 |
| 9,068,716 B2* | 6/2015 | Kang | F21V 7/048 |
| 2002/0024803 A1* | 2/2002 | Adachi | G02B 6/0021 362/613 |
| 2005/0265042 A1* | 12/2005 | Kim | F21K 9/00 362/555 |
| 2010/0002169 A1* | 1/2010 | Kuramitsu | G02B 6/0021 349/65 |
| 2010/0110330 A1* | 5/2010 | Ajichi | G02F 1/133611 349/62 |
| 2010/0110724 A1 | 5/2010 | Moncrieff | |
| 2010/0118530 A1* | 5/2010 | Nagai | H01L 25/0753 362/235 |
| 2010/0208490 A1* | 8/2010 | Tsuchiya | G02B 6/003 362/606 |
| 2011/0002142 A1* | 1/2011 | Yuuki | G02B 6/0036 362/606 |
| 2011/0013381 A1 | 1/2011 | Boulais | |
| 2011/0051397 A1* | 3/2011 | Bae | G02F 1/133603 362/97.1 |
| 2011/0051412 A1 | 3/2011 | Jeong et al. | |
| 2011/0228196 A1* | 9/2011 | Kubota | G02B 6/0021 349/62 |
| 2012/0013527 A1* | 1/2012 | Cao | G02F 1/133615 345/102 |
| 2012/0201050 A1* | 8/2012 | Kang | G02F 1/133603 362/611 |

FOREIGN PATENT DOCUMENTS

| | | |
|---|---|---|
| JP | 2010-135204 A | 6/2010 |
| KR | 10-2001-0041727 A | 5/2001 |
| KR | 10-2008-0029034 A | 4/2008 |
| KR | 10-2009-0071488 A | 7/2009 |
| KR | 10-2009-0071912 A | 7/2009 |
| KR | 10-2009-0127532 A | 12/2009 |
| KR | 10-2010-0066001 A | 6/2010 |
| KR | 10-2011-0022507 A | 3/2011 |
| KR | 10-2011-0032486 A | 3/2011 |
| TW | 201040598 A | 11/2010 |
| WO | WO-2011/080985 A1 | 7/2011 |

OTHER PUBLICATIONS

International Search Report in International Application No. PCT/KR2012/005960, filed Jul. 26, 2012.
Extended European Search Report dated Jun. 29, 2015 in European Application No. 12820168.8.

* cited by examiner

PRIOR ART

PRIOR ART

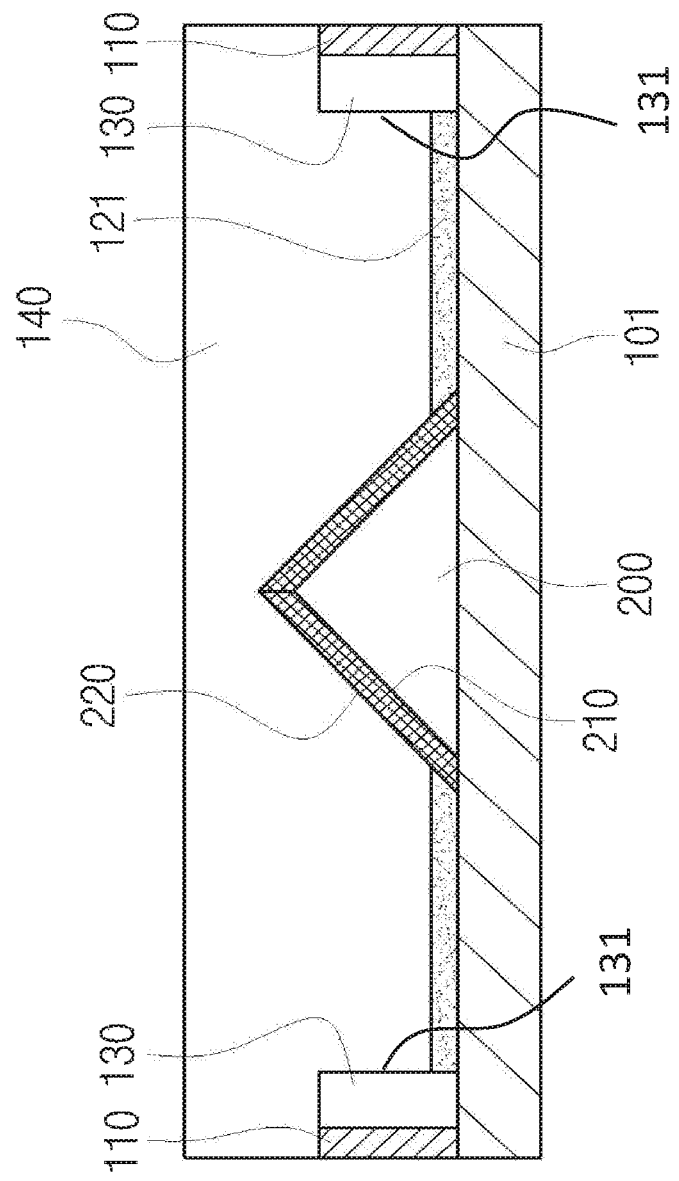
[FIG. 3]

[Fig. 4]
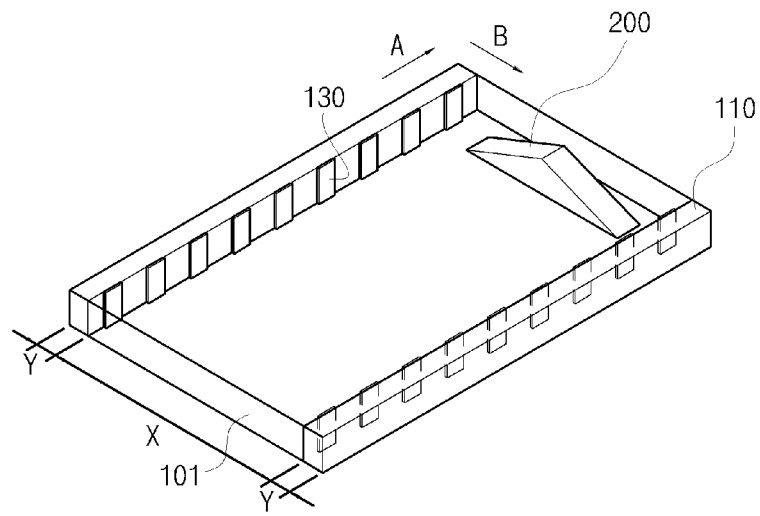
[Fig. 5]
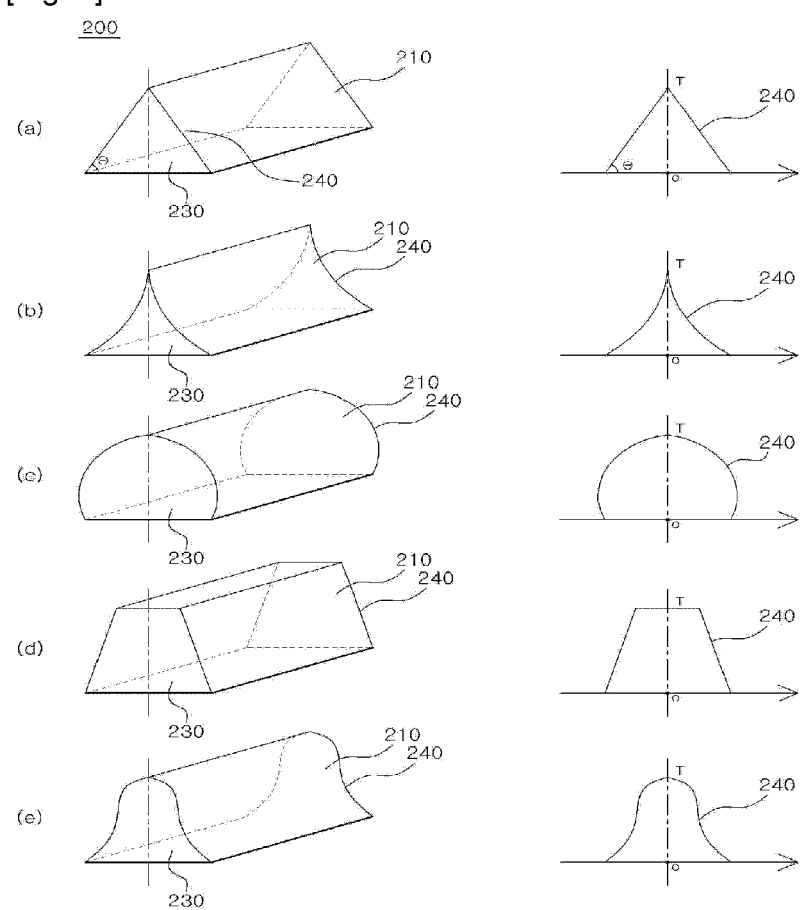

[ FIG. 6 ]
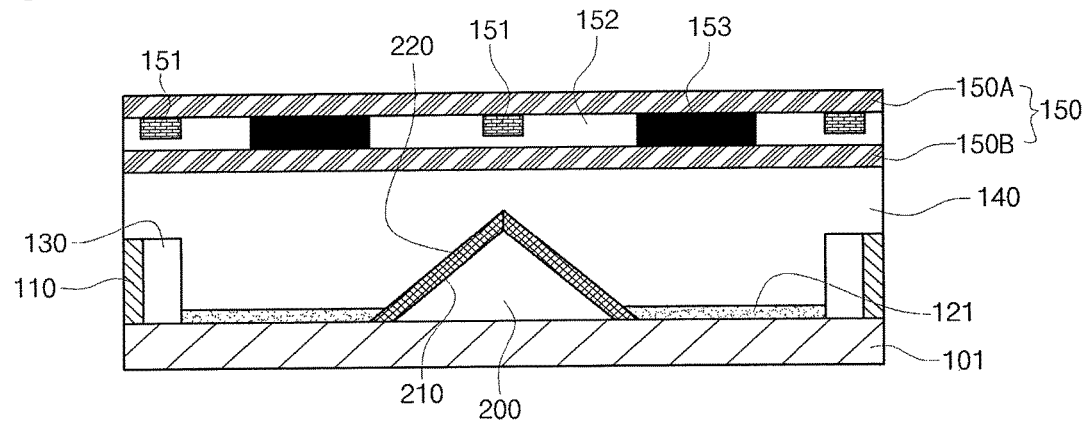
[ FIG. 7 ]
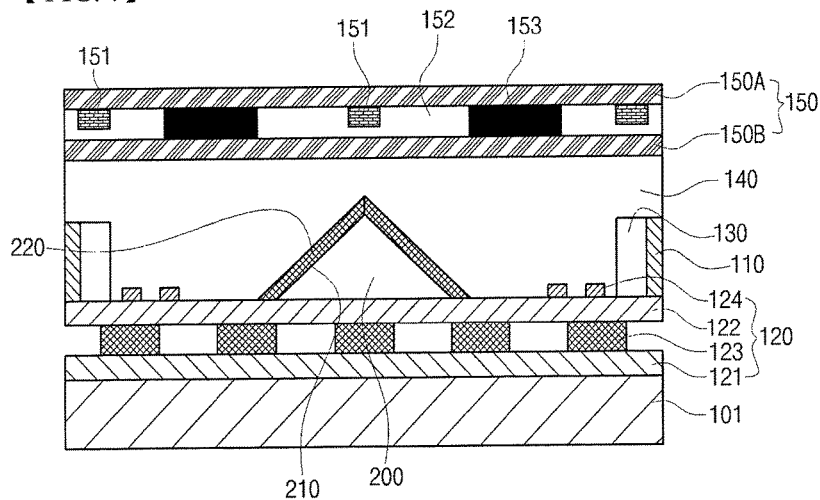

[FIG. 8]
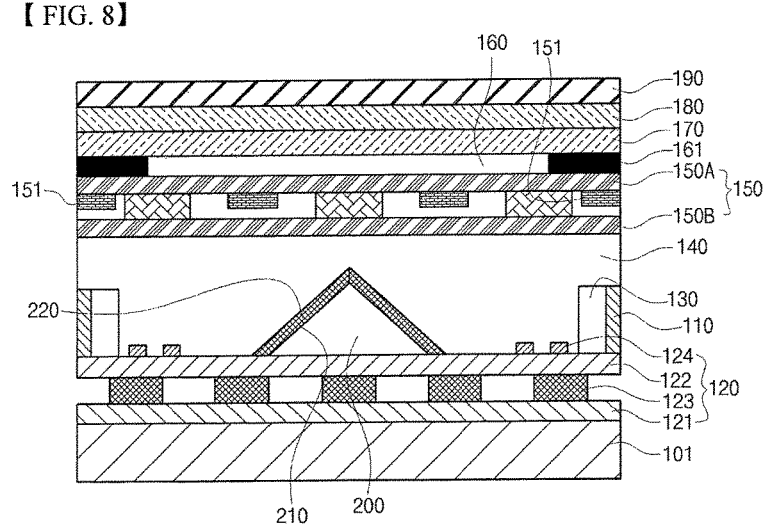
[FIG. 9]
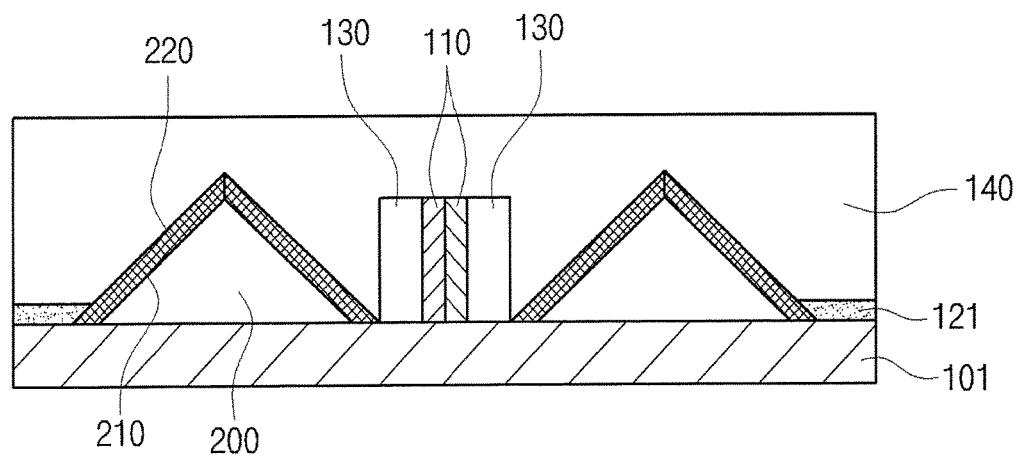

[FIG. 10]
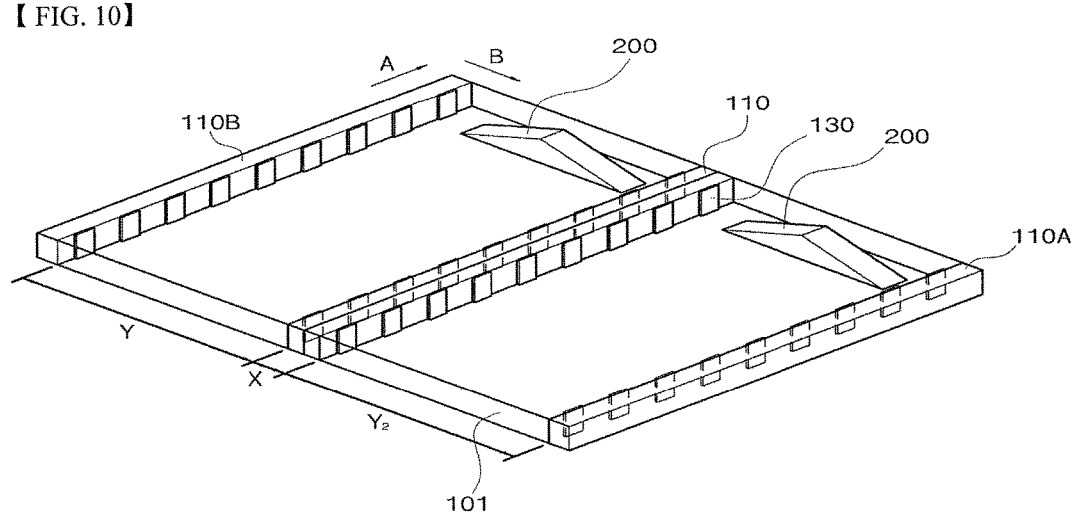
[FIG. 11]
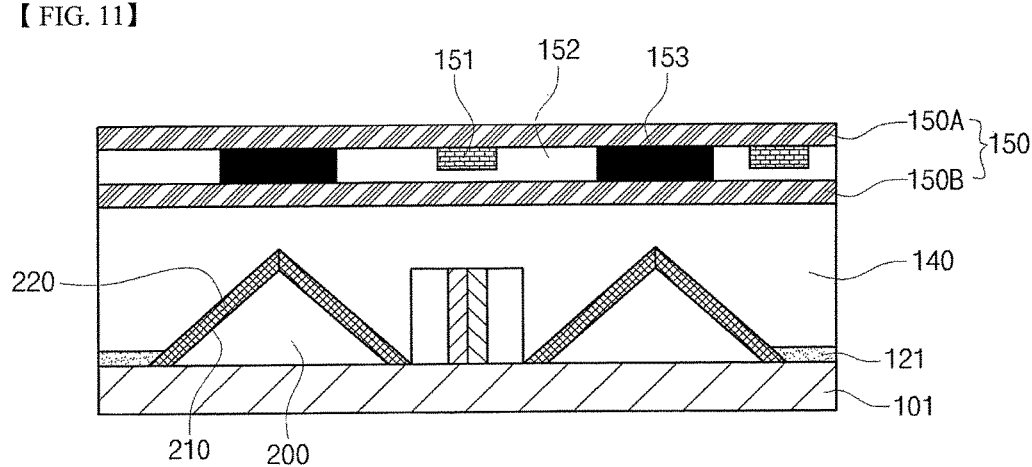

[Fig. 12]
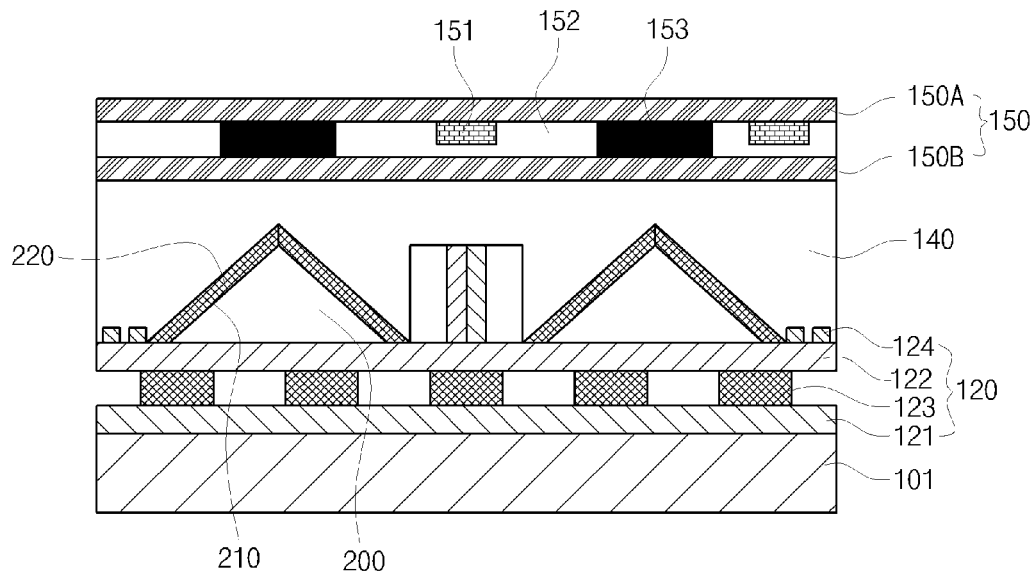
[Fig. 13]
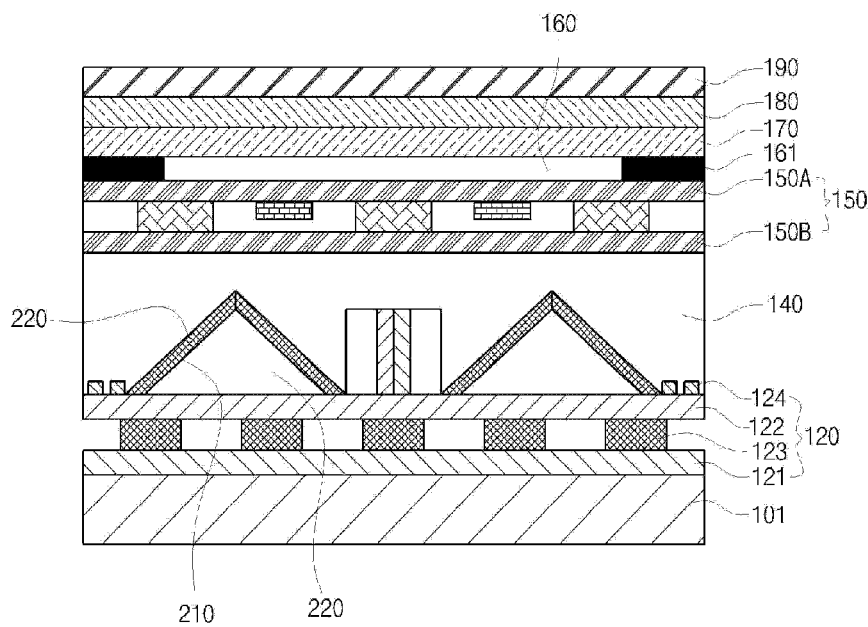

LIGHTING DEVICE AND LIQUID CRYSTAL DISPLAY DEVICE HAVING THE SAME

CROSS-REFERENCE TO RELATED APPLICATIONS

This application is the U.S. national stage application of International Patent Application No. PCT/KR2012/005960, filed Jul. 26, 2012, which claims priority to Korean Applications No. 10-2011-0076267, filed Jul. 29, 2011; No. 10-2011-0076458, filed Aug. 1, 2011; No. 10-2012-0017283, filed Feb. 21, 2012; and No. 10-2012-0017286, filed Feb. 21, 2012, the disclosures of each of which are incorporated herein by reference in their entirety.

TECHNICAL FIELD

The present invention relates to measures for efficiently forming a lighting device.

BACKGROUND ART

A lighting device which implements lighting by guiding light emitting from a light source has been variously used for a lamp for lighting, a lamp for vehicles, a liquid crystal display device and the like. In the lighting device, a technology for making the structure of equipment thin and a structure capable of improving the efficiency of light have been recognized as the most important technologies.

Hereinafter, as one example to which the lighting device is applied, a liquid crystal display device is explained.

FIG. 1 and FIG. 2 are conceptual views illustrating a structure of a conventional lighting device.

Referring to FIG. 1, a lighting device 1 is configured such that a flat light guide plate 30 is disposed on a substrate 20, and a plurality of side-view type LEDs 10 (only one being illustrated) are disposed in an array shape on a side surface of the light guide plate 30.

Light L incident to the light guide plate from the LEDs 10 is reflected upward by a fine reflective pattern or a reflection sheet 40 provided to a bottom surface of the light guide plate 30, is radiated from the light guide plate 30, and is then provided to an LCD panel 50 of an upper part of the light guide plate 30.

Referring to FIG. 2, the lighting device may be formed in a structure in which a diffuse sheet 31 or a plurality of optical sheets such as prism sheets 32, 33, a protective sheet 34 and the like is further added between the light guide plate 30 and the LCD panel 50.

That is, the light guide plate is basically used as an essential component of the lighting device, but due to a thickness of the light guide plate, there is a limitation to make a thickness of a whole product thin. In the case of a large-sized lighting device, it is problematic that image quality is deteriorated.

DISCLOSURE OF INVENTION

Technical Problem

An aspect of the present invention provides a lighting device and a liquid crystal display device having the lighting device, which is capable of guiding light over a whole surface by disposing an LED mounted on a printed circuit board in a bar type in an edge area of a base substrate.

Another aspect of the present invention provides a lighting device and a liquid crystal display device having the lighting device, which is capable of maximizing the improvement of light reflectance and the improvement of luminance by forming a reflection module as a construction which can efficiently reflect light radiated from a light source.

Still another aspect of the present invention provides a lighting device and a liquid crystal display device having the lighting device, which is capable of reducing the number of light sources, making a whole thickness of the lighting device thin, and increasing the freedom and reliability of a product design by removing a light guide plate which is essential for a structure of the lighting device and forming a structure in which a light source is guided using a resin layer in a film type.

Solution to Problem

According to an aspect of the present invention, there is provided a lighting device comprising: a base substrate; a plurality of LED light sources disposed in a center area of the base substrate in a first direction; and a resin layer stacked in a structure which covers the LED light sources.

The plurality of LED light sources may be mounted on a pair of first printed circuit boards in a bar type which are closely disposed in opposite directions to each other so that the light of the LED light sources is radiated.

The lighting device may further include a second printed circuit board in a bar type which is disposed in an edge area of the base substrate, and mounts the LED light sources on a surface thereof.

The lighting device may be configured such that the second printed circuit board includes one surface on which the plurality of LED light sources are mounted and another surface opposite to the one surface, and is disposed in a structure in which the one surface is embedded in the resin layer.

The LED light sources mounted on the first printed circuit board and the surface of the second printed circuit board may be a side view type or a top view type.

The second printed circuit board in the bar type may be configured such that at least two or more second printed circuit boards are formed in a first edge area which is a first direction of the base substrate or a second edge area which is a second direction of the base substrate.

The second printed circuit board disposed in the edge areas of the base substrate may be disposed in the first direction or in a second direction that meets at right angles to the first direction.

The lighting device may further include a reflection module having a slope surface corresponding to a light radiating direction of the LED light sources.

The reflection module may be configured such that an angle between a vertical incidence path of the light radiated from the LED light sources and the slope surface is an acute angle or an obtuse angle.

The reflection module may have a three-dimensional shape having a base surface, and the slope surface which is formed with a slope angle on one side or both sides of the base surface.

A vertical cross-section of the three-dimensional shape may be formed in at least one shape of a triangular shape, a trapezoidal shape, a semicircular shape, a semi-elliptic shape, and a slope shape.

The reflection module may be configured such that a reflective layer is coated with the slope surface.

The reflection module may further include a plurality of reflective patterns formed on the reflective layer.

A height of the reflection module may be formed to be less than a height of the resin layer.

The lighting device may further include a first reflective film adhered to a surface of the base substrate, and a second reflective film which is spaced by the first reflective film and an adhesive pattern material to thereby form an air area and is made of a transparent material.

The second reflective film may be configured such that a reflective pattern is further formed on a surface of the second reflective film.

The lighting device may further include an optical pattern layer which implements an optical pattern disposed on an upper part of the resin layer to thereby diffuse light.

The optical pattern layer may have a first substrate and a second substrate including the optical pattern in inner parts thereof, and an adhesive material may be applied to remaining parts except for the second air area surrounding around the optical pattern.

The lighting device may further include a diffuse plate disposed on an upper part of the optical pattern layer.

The lighting device may further include a third air area disposed between the optical pattern layer and the diffuse plate.

According to another aspect of the present invention, there is provided a liquid crystal display device comprising a lighting device, the light device comprising: a plurality of LED light sources disposed in an edge area of a base substrate in a first direction or a second direction; a resin layer stacked in a structure which covers the plurality of LED sources; and a reflection module having a slope surface corresponding to a light radiating direction of the LED light sources.

Advantageous Effects of the Invention

In accordance with an exemplary embodiment of the present invention, the light can be guided over a whole surface by disposing the LED light sources mounted on the printed circuit board in the bar type in an edge area of the base substrate.

In accordance with another exemplary embodiment of the present invention, the improvement of light reflectance and luminance can be maximized by forming the reflection module as a construction which can efficiently reflect the light emitted from the light source.

In accordance with still another exemplary embodiment of the present invention, the number of the light sources can be reduced, a whole thickness of the light device can be manufactured to be thin, and the freedom and reliability of a product design can be improved by removing the light guide plate which is a necessary part in the structure of the light device, and forming a structure in which the light source is guided using the resin layer in a film type.

In accordance with still another exemplary embodiment of the present invention, in addition to the elements of the reflection module and the resin layer, in a case where the reflective unit having the air area is further provided, the greater improvement of light reflectance and luminance can be achieved, luminance can be enhanced even without an increase in a thickness of the light device and the number of the light sources, and thanks to the pattern design of a spacer which forms the air area, the control and reflection efficiency of light and can be maximized.

In accordance with still another exemplary embodiment of the present invention, the optical pattern layer having the optical pattern is formed so that the air area is provided by patterning an adhesive material (i.e. the adhesive pattern layer), thereby preventing hot spots and a dark space from being generated in a part of a light shielding pattern, realizing the lighting device without the significant difference of optical characteristics while securing reliability between the adhesive material and the bonded parts, and allowing to accurately align the parts.

In particular, the side-view type light emitting diode is mounted in an edge type, thereby securing optical characteristics while largely reducing the number of the light sources, the light guide plate is removed, thereby allowing to be applied to a flexible display structure, and the reflective film including the reflective pattern and the diffuse plate including the air layer are provided to the resin layer, thereby securing a stable light emitting characteristic.

BRIEF DESCRIPTION OF DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 is a cross-section view illustrating a lighting device according to an exemplary embodiment of the present invention.

FIG. 4 is a perspective view illustrating a lighting device according to another exemplary embodiment of the present invention.

FIG. 5 illustrates various exemplary embodiments of a reflection module disposed in an inner part of the light device illustrated in FIG. 3

FIG. 6 through FIG. 8 are views illustrating various exemplary embodiments of the lighting device illustrated in FIG. 3.

FIG. 9 is a cross-section view illustrating a lighting device according to still another exemplary embodiment of the present invention.

FIG. 10 is a perspective view illustrating a lighting device according to still another exemplary embodiment of the present invention.

FIG. 11 through FIG. 13 are views illustrating various exemplary embodiments of the lighting device illustrated in FIG. 9.

BEST MODE FOR CARRYING OUT THE INVENTION

Figure 1:
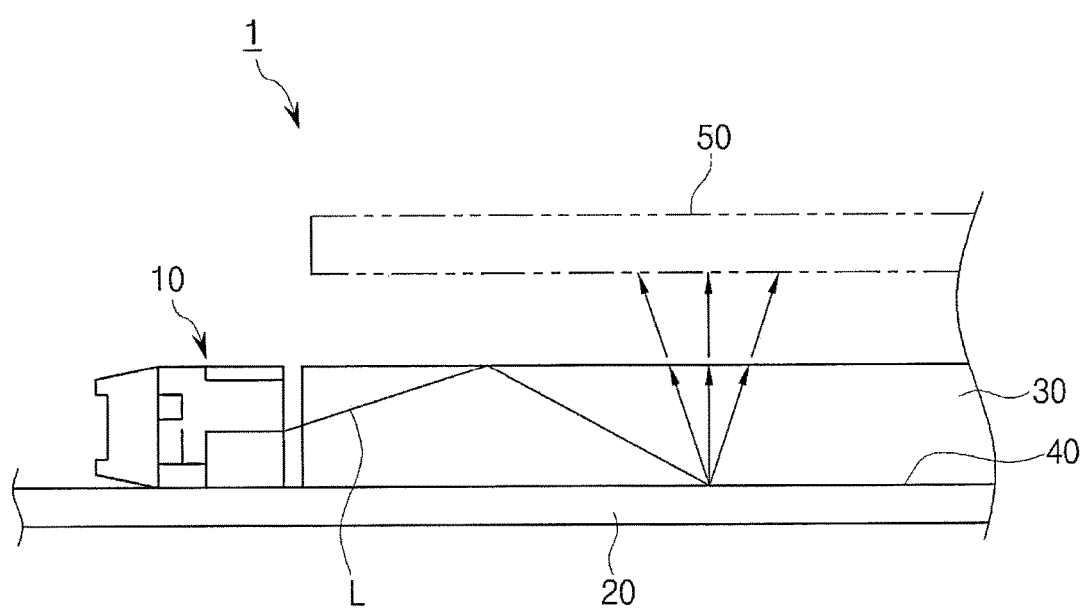
FIG. 1 and FIG. 2 are conceptual views illustrating a structure of a conventional lighting device.
Figure 2:
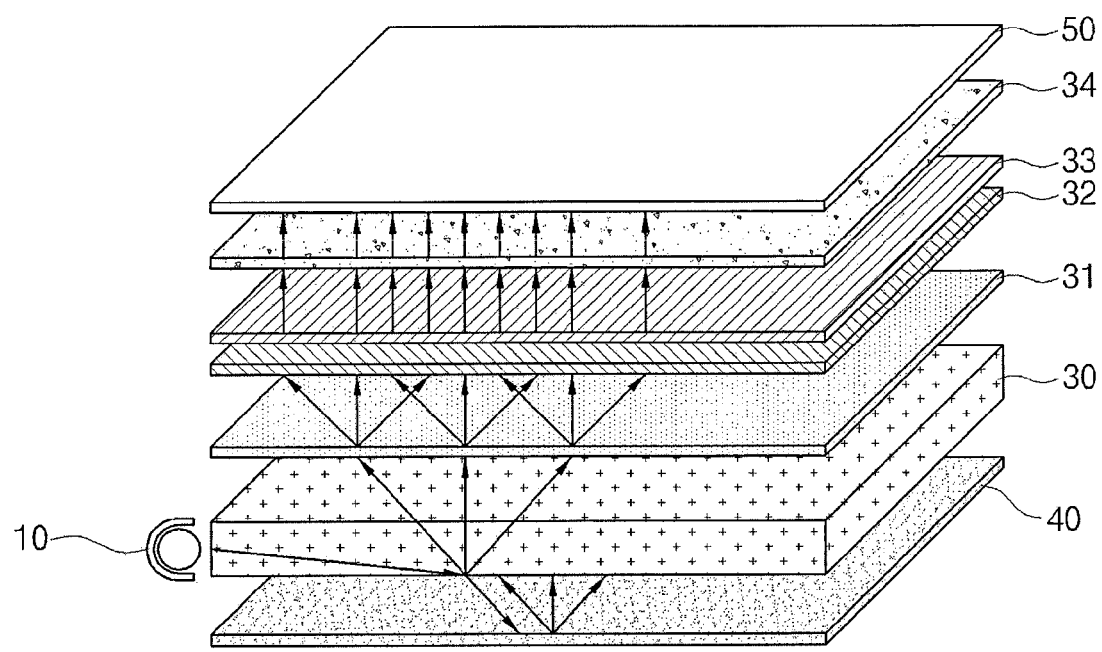

Exemplary embodiments according to the present invention will now be described more fully hereinafter with reference to the accompanying drawings. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

The gist of the present invention is to provide a technology which is able to maximize the efficiency of light by disposing an LED module in a bar type in a center area or an edge area of a base substrate which composes a lighting device using an LED as a light source.

The lighting device according the present invention is limited to being applied to a back light unit of a liquid crystal display device. That is, the lighting device may be applied to various lamp devices which require lighting, namely, a lamp for vehicles, a home lighting device, and an industrial lighting device. In the lamp for vehicles, it may be applied to a headlight, indoor illumination, a back light and the like.

First Exemplary Embodiment

FIG. 3 is a cross-section view illustrating a lighting device according to an exemplary embodiment of the present invention. FIG. 4 is a perspective view illustrating a lighting device according to another exemplary embodiment of the present invention.

Referring to FIG. 3 and FIG. 4, the lighting device according to the present invention may include: a base substrate 101; a printed circuit board 110 in a bar type which is disposed in an edge area Y of the based substrate 101, and mounts an LED light source 130 on a surface thereof; and a resin layer 140 stacked in a structure which covers the LED light source 130.

In particular, in a structure of the lighting device in which disposition of the LED light source according to the present exemplary embodiment of the invention is an edge type rather than a direct type, it is characterized in that a light source module is disposed in the edge area Y of the base substrate 101. Hereinafter, the edge area according to the present exemplary embodiment of the invention is defined as an outermost angle part of the base substrate which composes the lighting device or a width corresponding to a 1/5 to 1/10 ratio of a total width length of the base substrate in the outermost angle part. Moreover, the printed circuit board 110 including the LED light source according to the present exemplary embodiment of the invention may be disposed in each edge area (a first edge area and a second edge area) in a vertical direction (a first direction: A) and a horizontal direction (a second direction: B) of the base substrate. In this case, the printed circuit board 110 according to the present exemplary embodiment of the invention may be formed in a structure in which one surface on which the LED light source 130 is mounted is embedded in the applied resin layer 140, and the LED light source mounted on the surface of the printed circuit board may apply a side view type or a top view type.

Moreover, it is characterized in that the lighting device according to the present exemplary embodiment of the invention is particularly formed on the base substrate 110, and is configured to include a reflection module 200 having a slope surface corresponding to a light radiating direction of the LED light source. In particular, when considering a vertically progressing path of the light radiated from the LED light source 130, as a preferred embodiment of the reflection module 200, a three-dimensional construction having a slope surface which allows light to be incident having a fixed slope θ may be considered.

Furthermore, in the present invention, a light guide plate is removed in the structure of the conventional lighting device and the resin layer 140 for guiding the light radiated from the LED light source 130 toward a whole surface is installed. In particular, the reflection module is implemented on the resin layer so that the greater improvement of light reflectance can be achieved. That is, the resin layer 140 is stacked in a structure surrounding around the LED light source 130 and functions to diffuse the light of the LED light source radiated in a side direction. That is, the function of the conventional light guide plate may be performed by the resin layer 140.

That is, as illustrated in FIG. 3, the plurality of LED light sources formed on the printed circuit board 110 may use a side-view type LED. In this case, in the structure in which the plurality of LED light sources are aligned, the light radiated from a light radiating surface 131 may be incident in a structure which a slope is formed in a slope surface 210 of a reflection module 200 and may be then reflected. Accordingly, the slope surface having the reflection module according to the present exemplary embodiment of the invention which will be hereinafter described is defined as a concept covering all structures having various inclined curves and gradients except for a structure in which the light radiated from the LED light source and the slope surface are perpendicularly run against each other. Moreover, reflectance may be variously adjusted, luminance may be improved, and uniformity may be amended by adjusting a gradient θ of the reflection module 200 of FIG. 3.

Furthermore, a reflective layer 220 formed of Ag and the like may be formed on a surface of the reflection module according to the present exemplary embodiment of the invention. Also, a negative or positive reflective pattern may be implemented on the reflective layer 220. In the present exemplary embodiment of the invention, the reflective pattern may be printed using a reflective ink including at least one of $TiO_2$, $CaCO_3$, $BaSO_4$, $Al_2O_3$, Silicon, and PS. In addition to this reflection module 200, in the present exemplary embodiment of the invention, to improve the reflectance of light, the reflective film may be formed on a surface of the printed circuit board 110, and the reflective pattern implemented in the reflection module may be also formed on the reflective film 121. The reflective pattern may be formed in the light radiating direction of the LED light source. In particular, the reflective pattern may be disposed so that as the reflective pattern gradually gets away from the light radiating direction of the LED light source, a density of the pattern is increased. In the case of implementing a side view type LED, it is advantageous that the number of light sources can be largely reduced.

FIG. 5 illustrates various exemplary embodiments of the reflection module 200 disposed in an inner part of the lighting device according to the exemplary embodiments of the present invention mentioned in FIG. 3 and FIG. 4.

The reflection module 200 according to the present exemplary embodiment of the invention may apply any structure if the structure has a slope surface with a slope so that the light emitted from the light source can be again reflected by being reflected at the slope surface.

As this example, as illustrated in FIG. 4-(a), the reflection module may be implemented in a structure in which as a triangular prism structure, two slope surfaces are inclined and come into contact with each other at a fixed gradient θ on both sides of a base surface 230.

The base surface 230 corresponds to a part adhered to the printed circuit board 110, and the slope surface 210 corresponds to a part hit against the light radiated from the light source. As described above, the reflectance may be adjusted by adjusting the gradient θ, thereby minimizing the loss of light and improving luminance.

The image on the right of FIG. 5-(a) illustrates a vertical cross-section of the aforesaid reflection module in the triangular prism type which is provided with a triangular structure. As illustrated therein, when considering a virtual coordinate axis (an x-axis and a y-axis), one slope surface has a trace 240 of a fixed straight structure (y=ax+b, a & b=actual numbers, a). FIG. 5-(b) shows a structure in which the slope surface having a fixed curvature. In consideration of its cross-section, the trace 240 of the slope surface has a parabolic structure ($y=ax^2+b$, a & b=actual numbers, a). This parabolic structure is a concept including a curve having various curvatures as described above in addition to the curvature according to this mathematical formula. That is, like the structure illustrated in (c), the slope surface may have a same curvature as an outer surface of a semicircular column or a same curvature as an outer surface of a semielliptic column ($ax2+by2+c=0$, a and b represent actual numbers that o is not).

Furthermore, as illustrated in (d), the reflection module according to the present exemplary embodiment of the invention may be implemented in a prismatic shape, namely a structure in which its cross-section is a trapezoid. Moreover, like illustrated in (e), the trace of the slope surface may be implemented in an unspecified curve.

Taken together, the reflection module according to the present exemplary embodiment of the invention is a concept including all constructions having the slope surface which may implement a fixed slope in a surface corresponding to the light radiating surface (that is, including all slope surfaces having a structure in which an angle that the radiated light and the slope surface of the reflection module meet is not a right angle). The illustrated shape is exemplified as one three-dimensional shape, but this is only one exemplary embodiment. In addition to the structures illustrated in (a) to (e), a structure having one slope surface by cutting the module in a vertical direction, a structure disposing each of two or more modules or combining the modules in different shapes from each other may be also included in the gist of the present invention.

Second Exemplary Embodiment

FIG. 6 through FIG. 8 are views illustrating various exemplary embodiments of the lighting device illustrated in FIG. 3.

Referring to FIG. 6, in the present exemplary embodiment of the invention, the light device may be implemented in a structure in which an optical pattern layer 150 is further equipped on the resin layer 140. That is, in addition to the structure of FIG. 3, in the structure of the reflection module having the resin layer 140 and the slope surface corresponding to the light radiating direction of the light source, the optical pattern layer 150 may be further provided. As previously described, the resin layer 140 is stacked in a structure surrounding around the LED light source, and functions to diffuse the light of the light source radiated in the side direction. The reflection module 200 efficiently reflects the light radiated from the light source, thereby improving luminance.

Moreover, the optical pattern layer 150 in the present second exemplary embodiment is a construction formed to prevent the light radiated from the LED light source 130 from being concentrated. The optical pattern layer may be implemented in the following structure.

The optical pattern layer 150 may be configured to include an adhesive pattern layer 153 which forms a second air area 152 surrounding around the optical pattern. That is, the adhesive pattern layer 153 forms a spaced space (the second air area) having a pattern in a fixed shape on the optical pattern 151 and is implemented by applying and bonding an adhesive material to remaining parts except for the space.

That is, with regard to the structure of the illustrated drawing, in a disposition relationship between the optical pattern layer 150 and the adhesive pattern layer 153, the optical pattern layer 150 have a first substrate 150A and a second substrate 150B including the optical pattern in inner parts thereof, and the adhesive pattern layer 153 is applied to the remaining parts except for the second air area 152 surrounding around the light shielding pattern to thereby bond the first substrate 150A and the second substrate (150B). That is, the optical pattern 151 may be formed as the light shielding pattern formed to prevent the light radiated from the LED light source 130 from being concentrated. To achieve this, it is required to align positions between the optical pattern 151 and the LED light source. After aligning, to secure a fixing force, an adhesive may be used for adhesion.

The first substrate 150A and the second substrate 150B may use a substrate formed of a material having an excellent light transmission rate. As one example, PET may be used. In this case, the optical pattern 151 disposed between the first substrate 150A and the second substrate 150B basically functions to prevent the light radiated from the LED light source from being concentrated. The optical pattern may be implemented by performing light shielding printing on one of the first substrate 150A or the second substrate 150B and may be implemented to align by bonding the two substrates with the adhesive layer applying the adhesive material in a structure surrounding around the light shielding pattern. That is, the bonded structure of the first substrate 150A and the second substrate 150B may also implement the function to fix the printed light shielding pattern 151. Moreover, the adhesive layer may use at least one of a heat curing PSA, a heat curing adhesive, and an ultraviolet curing PSA type material.

When bonding the substrates by forming the adhesive pattern layer 153, if they are bonded in a pattern structure which forms the second air area 152, hot spots or a dark space caused by overlapping the adhesive material with the light shielding pattern can be prevented from being generated, and thanks to the presence of the air layer, the uniformity of light can be improved.

Third Exemplary Embodiment

Referring to FIG. 7, in addition to the configuration of the aforesaid second exemplary embodiment, it is characterized in that a reflective unit 120 is formed in a structure in the air area is implemented between the base substrate 101 and the resin layer 140.

The reflective unit 120 may include a first reflective film 121 adhered to a surface of the base substrate 101, and a second reflective film 122 which is spaced apart from the first reflective film 121 to thereby form the air area A1 and is made of a transparent material. The first and second reflective films 121, 122 are stacked on the base substrate.

The air area A1 may be formed in a structure in which the first and second reflective films 121, 122 are integrally compressed without using a member such as a separate adhesive. Furthermore, as illustrated, the first and second reflective films 121, 122 may be implemented to be spaced apart from each other so that the air area A1 in which air is received through a separation member 123 such as a separate adhesive member and the like is implemented.

In this case, the first reflective film 121 may use a reflective material which reflects light, for example, a film on which a metal layer made of Ag and the like is formed. The second reflective film 122 may use a film made of a transparent material so that the light radiated from the LED light source is transmitted to a surface of the first reflective film 122 and is then again reflected. In particular, in addition to the structure in which the light radiated from the light source 130 passes through the first reflective film and is again reflected at the second reflective film, the reflective pattern 124 may be provided by performing white printing on a surface of the second reflective film 122, thereby improving luminance by promoting the more diffusion of light. The reflective unit 120 in the third exemplary embodiment implements an advantage capable of maximizing the luminance of light along with the reflection module 200 according to the present exemplary embodiment of the invention.

Fourth Exemplary Embodiment

Referring to FIG. 8, in addition the structures described in the first to third exemplary embodiments, the air area disposed between the optical pattern layer 150 and a diffusion plate 170 may be further included. As one implemented example, the structure implementing the air area (hereinafter referred to as "a third air area") disposed between the optical pattern layer 150 and the diffusion plate 170 described in FIG. 7 is explained.

That is, to the configuration of the lighting device according to the present exemplary embodiment of the invention, the structure in which the air layer (the third air area 160) is provided between the optical pattern layer 150 and the diffusion plate 170 may be added. Thanks to the presence of the third air area 160, it is achieved with the effect that the light radiated from the light source can be diffused, and uniformity of the light can be improved. Moreover, to minimize deviation of the light passing through the resin layer 140 and the optical pattern layer 150, a thickness of the third air area may be formed in a range of 0.01 to 2 mm.

The third air area 160 may be formed by implementing a structure in which the air layer is formed in a lower part of the diffusion plate 170. The third air area may include a method in which the air area (i.e. the air layer) is implemented by processing the diffusion plate itself or a configuration in which the air area is formed by forming a separate construction 161 in the lower part of the diffusion plate 170.

The lighting device according to the present exemplary embodiment of the invention may be applied to an LCD device through the following configurations and functions. Referring to a structure of FIG. 8, the light is radiated from the side view type LED light source 130 in a side direction, and the radiated light is reflected and diffused at the resin layer 140 formed instead to the conventional light guide plate. In particular, thanks to the light which is again reflected on a boundary surface of the reflection module 200 corresponding to the light radiating surface, the greater improvement of luminance of the light can be achieved.

Moreover, the radiated and reflected light travels in a direction of the diffusion plate. In this case, concentration of the light can be prevented by the optical pattern layer 150, and deviation of the light can be minimized by the third air area formed in the lower part of the diffusion plate.

In particular, thanks to the presence of the reflective unit 120 according to the present exemplary embodiment of the invention disposed between the resin layer 140 and the printed circuit board 110, the greater improvement of reflectance can be achieved, the efficiency of light can be maximized, and the enhancement effect of luminance can be realized. In particular, in the case of the reflective unit 120 according to the present exemplary embodiment of the invention, designs for implementing the air area by patterning the adhesive material layer may be implemented to vary, thereby implementing the control of reflectance. Depending upon a material and a kind of the patterned adhesive material, the implementation of different reflectance and colors may be adjusted. Moreover, reflectance may be adjusted depending upon optical characteristics and a thickness of the second reflective film 122.

Fifth Exemplary Embodiment

FIG. 9 is a cross-section view illustrating the lighting device according to still another exemplary embodiment of the present invention. FIG. 10 is a perspective view illustrating the lighting device according to still another exemplary embodiment of the present invention.

Referring to FIG. 9 and FIG. 10, the lighting device according to the present exemplary embodiment of the invention may include the base substrate 101; the plurality of LED light sources disposed in a center area X of the base substrate in the first direction; the resin layer 140 stacked in a structure which covers the LED light sources 130. In particular, the disposition of the light source according to the present exemplary embodiment of the invention is characterized in that in the structure of the lighting device which is not a direct type structure but an edge type, the optical module is disposed in the center area X of the base substrate 101.

In this case, the plurality of LED light sources 130 may have a structure in which the LED light sources are mounted on the pair of first printed circuit boards 110 in the bar type which are closely disposed in opposite directions to each other so as to emit light, and a side-view type LED or a top type LED may be applied thereto. Of course, in this case, because it would be preferable that the light is radiated in a direction of the Y area illustrated in FIG. 10 and in both sides, the printed circuit board 110 may be configured by closely disposing the structures in which the LED light sources are mounted on each flat surface or may use a double-sided printed circuit board.

Moreover, like the structure illustrated in FIG. 10, the first printed circuit board 110 may be disposed in the edge area Y of the base substrate 101 in addition to the center area X, and the second printed circuit boards 110A, 110B in a bar type having the LED light sources mounted on its surface may be further included. That is, the second printed circuit boards 110A, 110B are disposed in the edge part of the base substrate, and thus the LED light sources may be provided so as to emit the light toward the center area X. The center area X in the present exemplary embodiment of the invention is defined as a width corresponding to 1/5 to 1/10 of a total width of the whole base substrate based on a center line of the base substrate. The edge area Y is defined as an edge part at the outermost angle of the whole base substrate. Accordingly, the edge area in which the second printed circuit boards 110A, 110B according to the present exemplary embodiment of the invention are disposed may be also disposed in the edge part in a horizontal direction(a second direction; B) of the base substrate in addition to a vertical direction of the based substrate (a first direction; A) like the illustrated structure. The first and second printed circuit boards are disposed in a direction that the first direction and the second direction cross at right angles.

Sixth Exemplary Embodiment

FIG. 11 through FIG. 13 are views illustrating various exemplary embodiments of the lighting device illustrated in FIG. 9.

Referring to FIG. 11, in the present exemplary embodiment of the invention, the lighting device may be implemented in a structure in which the optical pattern layer 150 is further equipped on the resin layer 140. That is, in addition to the structure of FIG. 9, in the structure in which the reflection module 200 has the resin layer 140 and the slope surface corresponding to the light radiating direction of the light sources, the optical pattern layer 150 maybe further provided. The resin layer 140 may be stacked in the structure surrounding around the LED light sources 130 and may function to diffuse the light of the light sources radiated in the side direction. The reflection module 200 may efficiently reflect the light radiated from the light sources, thereby improving luminance.

The optical pattern layer 150 may include the adhesive pattern layer 153 which forms the second air area 152 surrounding around the optical pattern. That is, the adhesive pattern layer 153 forms the spaced space (the second air area) having the pattern in a fixed shape in the optical pattern 151, and is implemented by applying and bonding the adhesive material to remaining parts except for the space.

Seventh Exemplary Embodiment

Referring to FIG. 12, in addition to the configuration of the second exemplary embodiment, the reflective unit 120 may be formed in structure in which the air area is implemented between the base substrate 101 and the resin layer 140.

The reflective unit 120 may include the first reflective film 121 adhered on the surface of the base substrate 101 and the second reflective film 122 which is spaced apart from the first reflective film 121 to thereby form the air area A1 and is made of a transparent material. The first and second reflective films 121, 122 are stacked on the base substrate.

The air area A1 may be formed in a structure in which the first and second reflective films 121, 122 are integrally compressed without using a member such as a separate adhesive. Furthermore, as illustrated, the air area A1 may be also implemented in such a manner that the first and second reflective films 121, 122 are spaced apart from each other to implement the air area A1 in which air is received through the separation member 123 such as a separate adhesive.

Eighth Exemplary Embodiment

Referring to FIG. 13, in addition the structures described in the fifth to seventh exemplary embodiments, the air area disposed between the optical pattern layer 150 and the diffusion plate 170 may be further included. As one implemented example, it will be explained that the air area (hereinafter referred to as "the third air area") disposed between the optical pattern layer 150 and the diffusion plate 170 described in FIG. 12 is implemented.

That is, to the configuration of the lighting device according to the present exemplary embodiment of the invention, the structure in which the air area (the third air area 160) is provided between the optical pattern layer 150 and the diffusion plate 170 may be added. Thanks to the presence of the third air area 160, it is effective to diffuse the light radiated from the light source and to improve uniformity of the light. Moreover, a thickness of the third air area 160 may be formed in a range of 0.01 to 2 mm so that deviation of the light passing through the resin layer 140 and the optical pattern layer 150 can be minimized.

The third air area 160 may be formed by implementing a structure in which the air layer is formed in the lower part of the diffusion plate 170. The third air area may include the method of implementing the air area (i.e. the air layer) by processing the diffusion plate itself or the configuration wherein the air area is formed by forming a separate construction 161 in the lower part of the diffusion plate 170.

The resin layer used in the aforesaid first or eighth exemplary embodiments may use the following resin.

The resin layer according to the present exemplary embodiment of the invention may basically use any of resins made of a material which can diffuse light. As one example, a main material of the resin layer as one exemplary embodiment according to the present invention may use a resin having an urethane acrylrate oligomer as a main row material. For example, a mixture of the urethane acrylrate oligomer which is a synthetic oligomer, and a polymer type which is polyacrylic may be used. Of course, hereto, a monomer in which IBOA (isobornyl acrylate), HPA (Hydroxylpropyl acrylate), 2-HEA (2-hydroxyethyl acrylate) and the like that are a diluted reactive monomer having a low boiling point are mixed may be further included. As additives, a photoinitiator (for example, 1-hydroxycyclohexyl phenyl-ketone and the like) or an antioxidant may be mixed. Moreover, the resin layer may include a bead to increase the diffusion and reflection of light. The bead may be included in a range of 0.01 to 0.3 wt. % to a total weight of the resin layer. That is, the light radiated from the LED light sources in the side direction may travel in an upper direction by being diffused and reflected through the resin layer 140 and the bead. Thanks to the presence of the resin layer, because a thickness occupied by the conventional light guide plate can be innovatively reduced, a whole product can be made thin and have ductile quality, thereby having generality which can be also applied to a flexible display device.

Taken together, in addition to the disposition structure of the light source having the edge type structure, the lighting device according to the present exemplary embodiment of the invention can maximize the efficiency of light by installing the optical module in the center area to solve the problem such as the reduction of luminance in the center area of the base substrate.

Furthermore, thanks to the disposition of the optical module in the center area, and the presence of the reflection module 120 having the slope surface corresponding to the light radiating direction of the light source, the luminance of light can be generally maximized. Furthermore, additionally, thanks to the reflective unit 120 and the reflective pattern 124, the greater improvement of reflection efficiency of the light can be achieved, and the light can be guided forward.

Like this, the light passing through the resin layer 140 is diffused or shielded through the optical pattern 151 formed in the optical pattern layer 150. Optical characteristics of the refined light are refined once again through the third air area formed in the lower part of the diffusion plate to thereby increase uniformity, and is incident to the LCD panel as white light through an optical sheet such as a prism sheet 180 and a DBEF 190 which will be added later.

Like this, in the case of the lighting device according to the present exemplary embodiment of the invention, reflection efficiency can be maximized by the structure in which the air area of the reflective unit is provided. Furthermore, the light guide plate is removed, the side-view type LED is applied as the supply source of light, and the light is guided by diffusing and reflecting the light through the resin layer, thereby sliming the product and reducing the number of light sources. Meanwhile, the problems such as the deterioration of luminance and uniformity caused by the reduction of the number of the light sources can be adjusted by providing the reflective pattern, the shielding pattern and the air area of the air gap module, thereby being capable of improving the optical characteristics.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

The invention claimed is:

1. A lighting device comprising:
    a base substrate;
    a plurality of LED light sources disposed in a center area of the base substrate in a first direction;
    a pair of first printed circuit boards disposed on a top surface of the base substrate;
    a reflective film disposed on the base substrate;
    a reflection module having a slope surface corresponding to a light radiating direction of the LED light sources; and
    a resin layer stacked in a structure that covers the LED light sources, the pair of first printed circuit boards, the reflective film, and the reflection module;
    wherein the reflection module has a three-dimensional shape with a base surface, and the slope surface is formed with a gradient in one side or both sides of the base surface,
    wherein the reflection module is configured such that an angle between a vertical incidence path of the light radiated from the LED light sources and the slope surface forms an acute angle or an obtuse angle,
    wherein the slope surface is coated with a reflection layer,
    wherein the resin layer is contacted with the pair of first printed circuit boards, the plurality of LED light sources, the reflective film, and the reflection layer on the slope surface;
    wherein the reflection layer comprises:
    a first portion directly contacted with the reflective film, and
    a second portion directly contacted with the resin layer;
    wherein the reflection module further comprises a plurality reflective patterns formed on the reflection layer, and
    wherein the reflective patterns are disposed so that a density of the reflective patterns increases as a distance from the LED light source increases.

2. The lighting device of claim 1, wherein the plurality of LED light sources are mounted on the pair of first printed circuit boards in a bar type which are closely disposed in opposite directions to each other so as to radiate light from the LED light sources.

3. The lighting device of claim 2, further comprising a second printed circuit board in a bar type which is disposed in an edge area of the base substrate and mounts the LED light sources on a first surface thereof.

4. The lighting device of claim 3, wherein the second printed circuit board comprises the first surface on which the plurality of LED light sources are mounted and a second surface opposite to the first surface, the first surface being disposed in a structure which is embedded in the resin layer.

5. The lighting device of claim 4, wherein the plurality of LED light sources comprises:
    a first LED light source and a second LED light source mounted on the pair of first printed circuit boards which are disposed in opposite directions to each other so as to radiate light from the first and second LED light sources, and
    a third LED light source mounted on the second printed circuit board;
    wherein the first LED light source, the second LED light source, the third LED light source, and the reflection module are aligned in a vertical line perpendicular to the first direction.

6. The lighting device of claim 3, wherein the second printed circuit board in the bar type is configured such that at least two or more second printed circuit boards are disposed in a first edge area of the base substrate or a second edge area of the base substrate.

7. The lighting device of claim 3, wherein the second printed circuit board disposed in the edge area of the base substrate is disposed along the first direction or along a second direction perpendicular to the first direction.

8. The lighting device of claim 1, wherein a vertical cross-section surface of the three-dimensional shape is formed in at least one shape of a triangular shape, trapezoidal shape, a semicircular shape, a semielliptical shape and a slope shape.

9. The lighting device of claim 1, wherein a height of the reflection module is formed to be less than a height of the resin layer.

10. The lighting device of claim 9, wherein the reflection film comprises:
    a first reflective film adhered to a surface of the base substrate;
    an adhesive pattern disposed on the first reflective film; and
    a second reflective film on the adhesive pattern and spaced apart from the first reflective film by the adhesive pattern,
    wherein a width of the adhesive pattern is narrower than a width of the first reflective film, and
    wherein an air gap is formed between, the first reflective film and the second reflective film.

11. The lighting device of claim 10, wherein the second reflective film is configured such that a reflective pattern is further formed on a surface of the second reflective film.

12. The lighting device of claim 9, further comprising an optical pattern layer which is disposed on an upper part of the resin layer to thereby implement an optical pattern for diffusing light.

13. The lighting device of claim 12, wherein the optical pattern layer has a first substrate and a second substrate including the optical pattern in inner parts thereof, and an adhesive material is applied to remaining parts except for a second air area surrounding the optical pattern.

14. The lighting device of claim 12, further comprising a diffuse plate disposed on an upper part of the optical pattern layer.

15. The lighting device of claim 14, further comprising a third air area disposed between the optical pattern layer and the diffuse plate.

* * * * *